United States Patent
Rule et al.

(10) Patent No.: US 8,333,360 B2
(45) Date of Patent: Dec. 18, 2012

(54) POLYMERIC MOLDS AND ARTICLES MADE THEREFROM

(75) Inventors: Joseph D. Rule, Cottage Grove, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/999,022

(22) PCT Filed: Apr. 28, 2009

(86) PCT No.: PCT/US2009/041936
§ 371 (c)(1),
(2), (4) Date: Dec. 14, 2010

(87) PCT Pub. No.: WO2009/154879
PCT Pub. Date: Dec. 23, 2009

(65) Prior Publication Data
US 2011/0095165 A1    Apr. 28, 2011

Related U.S. Application Data

(60) Provisional application No. 61/074,312, filed on Jun. 20, 2008.

(51) Int. Cl.
*B29C 33/00* (2006.01)
*C08G 61/08* (2006.01)
*C08F 4/69* (2006.01)

(52) U.S. Cl. ............... 249/187.1; 526/243; 526/245; 526/247; 526/248; 526/250; 526/251; 526/283

(58) Field of Classification Search .......... 249/134, 249/187.1; 526/283, 243, 245, 247, 248, 526/250, 251
See application file for complete search history.

(56) References Cited

U.S. PATENT DOCUMENTS

| | | | |
|---|---|---|---|
| 4,400,340 A | 8/1983 | Klosiewicz | |
| 4,481,344 A | 11/1984 | Newburg | |
| 4,598,102 A | 7/1986 | Leach | |
| 4,751,337 A | 6/1988 | Espy et al. | |
| 4,940,561 A | 7/1990 | Fritz | |
| 5,008,065 A | 4/1991 | Okumura et al. | |
| 5,142,006 A | 8/1992 | Kelsey | |
| 5,152,917 A | 10/1992 | Pieper et al. | |
| 5,177,166 A | 1/1993 | Kobo et al. | |
| 5,229,473 A | 7/1993 | Kobo et al. | |
| 5,296,566 A | 3/1994 | Brown-Wensley et al. | |
| 5,312,940 A | 5/1994 | Grubbs et al. | |
| 5,468,819 A | 11/1995 | Goodall et al. | |
| 5,849,209 A | 12/1998 | Kindt-Larsen et al. | |
| 5,849,851 A | 12/1998 | Grubbs et al. | |
| 5,939,504 A | 8/1999 | Woodson, Jr. et al. | |
| 5,969,170 A | 10/1999 | Grubbs et al. | |
| 5,973,085 A | 10/1999 | Mühlebach et al. | |
| 6,117,521 A * | 9/2000 | Yoshida et al. | ......... 428/119 |
| 6,376,569 B1 | 4/2002 | Oxman et al. | |
| 6,610,382 B1 | 8/2003 | Kobe et al. | |
| 6,800,170 B2 | 10/2004 | Kendall et al. | |
| 6,800,234 B2 | 10/2004 | Ferguson et al. | |
| 6,828,007 B2 | 12/2004 | Obuchi et al. | |
| 6,872,792 B2 | 3/2005 | Kendall et al. | |
| 6,904,615 B2 | 6/2005 | Kobe et al. | |
| 6,921,796 B2 | 7/2005 | Hetherington | |
| 6,953,623 B2 | 10/2005 | Olson et al. | |
| 7,074,858 B2 | 7/2006 | Heilmann et al. | |
| 7,326,380 B2 | 2/2008 | Mirkin et al. | |
| 7,833,443 B2 * | 11/2010 | Yin et al. | ......... 264/2.5 |
| 2003/0187168 A1 | 10/2003 | Sunaga et al. | |
| 2006/0169869 A1 * | 8/2006 | Jimbo | ......... 249/134 |
| 2007/0037940 A1 | 2/2007 | Lazzari et al. | |
| 2008/0093776 A1 | 4/2008 | Williams | |

FOREIGN PATENT DOCUMENTS

| | | |
|---|---|---|
| EP | 0758657 A2 | 2/1997 |
| EP | 1 298 156 | 4/2003 |
| KR | 2001-0013130 A | 2/2001 |
| WO | WO 93-13171 A2 | 7/1993 |
| WO | WO 94-02529 A1 | 2/1994 |
| WO | WO 00/17712 | 3/2000 |
| WO | WO 2004/033553 | 4/2004 |
| WO | WO 2005/046964 | 5/2005 |
| WO | WO 2007/137102 | 11/2007 |

OTHER PUBLICATIONS

Kim Y.S., "Nancifeature-Patterned Polymer Mold Fabrication toward Precisely Defined Nanostructured Replication", Chem, Mater., vol. 17, 2005. pp. 5867-5870.
Extended European Search Report, PCT/US2009/041936, mailed Feb. 1, 2012, 7 pages.
Encyclopedia of Polymer Science and Engineering. 1987, vol. 9, pp. 634-668.
Bazan, et al., Journal American Chemical Society, 1990, 112, 8378-8387.
Feast, et al., Polymer 1979, 20, 1182-1183.
Feast et al., Journal of Molecular Catalysis 1980, 8, 277-296.
Seehof et al., Macromolecules 1993, 26, 695-700.
Seehof et al., Makro. Chem. Rapid Ccuntilun. 1991, 12, 107-112.
Seehof et al., Journal of Molecular Catalysis 1992, 76, 53-63.

* cited by examiner

*Primary Examiner* — Fred M Teskin
(74) *Attorney, Agent, or Firm* — Steven E. Skolnick

(57) ABSTRACT

Disclosed herein are polymeric molds that can be used to make molded articles. The polymeric molds are made from cyclic olefin polymers that may be formed by ring opening metathesis polymerization (ROMP) of a polycyclic monomer having two or more reactive double bonds and a cyclic monomer comprising one reactive double bond. Fluorinated monomers may be used. The polymeric molds may be structured molds in that they have at least one microstructured feature having a dimension of less than about 2 mm, or less than about 500 um. The polymeric molds may also have a plurality of such microstructured features. Also disclosed herein are methods of making the polymeric molds, methods of making molded articles therefrom, and the molded articles.

9 Claims, 1 Drawing Sheet

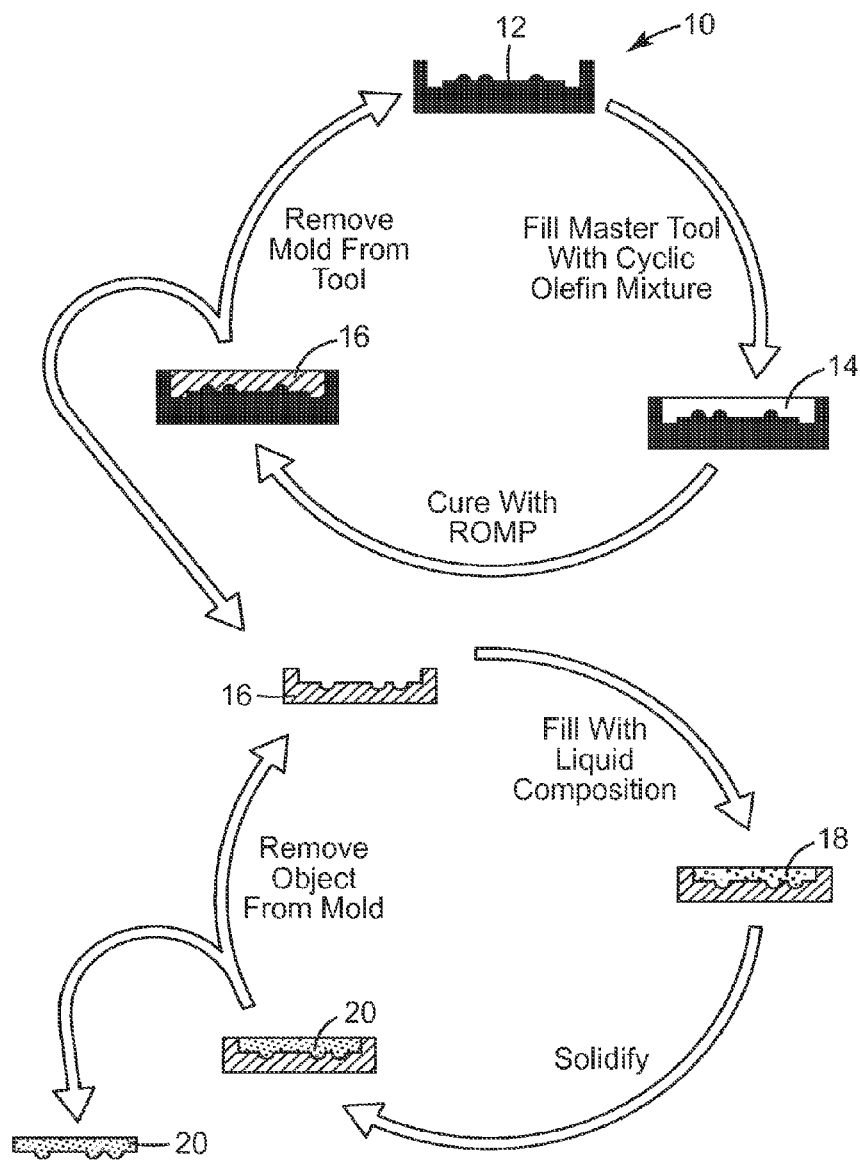

POLYMERIC MOLDS AND ARTICLES MADE THEREFROM

CROSS REFERENCE TO RELATED APPLICATION

This application is a national stage filing under 35 U.S.C. 371 of PCT/US2009/041936, filed Apr. 28, 2009, which claims priority to U.S. Provisional Application No. 61/074,312, filed Jun. 20, 2008, the disclosures of which are incorporated by reference in its entirety herein.

FIELD

This disclosure relates to polymeric molds and particularly, to polymeric molds made from cyclic olefin polymers. The polymeric molds can be used to make molded articles having microstructured features.

BACKGROUND

Polymeric molds are typically made from silicone rubbers and urethane rubbers. Silicone rubbers often have high oxygen solubility which can undesirably lead to inhibition of free radical curing reactions used to make molded articles from the silicone rubber molds. If a molded article is prepared by curing a silicone material in a silicone rubber mold, the adhesion between the two silicones may cause difficulty in releasing the molded article. Additionally, curing of silicone materials typically requires hours, so making multiple polymeric molds from a single master tool can be very time consuming. A particular disadvantage of urethane-based molds is often relatively difficult release of the molded article, particularly when no release agent is used.

Microstructured molds comprising features of less than several millimeters are used in replication processes for forming microstructured molded articles able to perform a specific function. The microstructured molded articles can be made directly from the microstructured mold which in turn is formed from a microstructured tool. Microstructured molded articles are used in a variety of applications including optical applications in which they function as prisms, lenses, light guides, and the like. In such applications, it is often critical that these microstructured molds be free of imperfections that might otherwise produce undesirable optical artifacts.

SUMMARY

Disclosed herein are polymeric molds that can be used to make molded articles. The polymeric molds may comprise a polymer formed by ring opening metathesis polymerization (ROMP) of a polycyclic monomer having two or more reactive double bonds, and/or a cyclic monomer comprising one reactive double bond. The polymeric mold may also comprise a polymer formed by ring opening metathesis polymerization of a polycyclic monomer having two or more reactive double bonds, and a fluorinated cyclic monomer having a reactive double bond. The polymeric molds may be structured molds in that they comprise at least one microstructured feature having a dimension of less than about 2 mm, or less than about 500 um. The polymeric molds may also comprise a plurality of such microstructured features.

Also disclosed herein are methods of making the polymeric molds, comprising: providing a master mold; providing a monomer composition comprising: a polycyclic monomer having two or more reactive double bonds, and/or a cyclic monomer having a reactive double bond; contacting a surface of the master mold with the monomer composition; polymerizing the monomer composition to form a polymeric mold comprising a polymer; and separating the polymeric mold from the master mold. The cyclic monomer may be fluorinated.

The polymeric molds may be used to form molded articles by: providing a polymeric mold comprising a polymer formed by ring opening metathesis polymerization of: a polycyclic monomer having two or more reactive double bonds, and/or a cyclic monomer having a reactive double bond; providing a liquid composition; contacting a surface of the polymeric mold with the liquid composition; forming the liquid composition into a molded article; and separating the molded article from the polymeric mold. The cyclic monomer may be fluorinated. The liquid compositions may be heat and/or radiation curable compositions of one or more monomers, or they may be molten materials that solidify on cooling.

The molded articles prepared according to the above methods may be structured articles in that they comprise at least one microstructured feature having a dimension of less than about 2 mm, or less than about 500 um. The molded articles may also comprise a plurality of such microstructured features. Examples of molded articles include a light guide, a brightness enhancement film, a retroreflective film, or a microfluidic device. Another example of a molded article comprises a plurality of abrasive composites, each of the abrasive composites comprising a plurality of abrasive grains dispersed in a binder. Yet another example of a molded article comprises a plurality of stems, each stem providing a static coefficient of friction when dry of at least about 0.6.

These and other aspects of the invention are described in the detailed description below. In no event should the above summary be construed as a limitation on the claimed subject matter which is defined solely by the claims as set forth herein.

BRIEF DESCRIPTION OF DRAWING

The drawing shows an exemplary process flow diagram for making the polymeric molds disclosed herein.

DETAILED DESCRIPTION

Numerous advantages may be provided by the polymeric molds disclosed herein as well as for the methods of making the molds. The polymeric molds may have good physical strength and toughness to allow the molded article to be cleanly removed from the mold for multiple cycles without damaging the mold. Surface replication of a master mold used to make the polymeric molds may be relatively efficient compared to replication involving other types of chemistries which reduces time lost from waiting for the polymeric molds to cure. Further, the polymeric molds exhibit minimal if any tendency to inhibit free radical polymerization of monomers that are used to make articles or parts from the molds which also reduces time required for making the articles. Thus, the polymeric molds and methods for making the molds may enable fast production processes such as continuous cast and cure. The use of ROMP to make micropatterned or microstructured molds can enable nanofabrication of molded articles suitable for use in, for example, electronics applications.

In general, the polymeric molds disclosed herein comprise one or more polymers prepared by ring opening metathesis polymerization of cycloalkenes initiated by olefin metathesis catalysts; see for example, K. J. Ivin, "Metathesis Polymerization" in J. I. Kroschwitz, ed., *Encyclopedia of Polymer Science and Engineering*, Vol. 9, John Wiley & Sons, Inc., U.S.A., 1987, p. 634. Metathesis polymerization of cycloalkene monomers typically yields polymers having an unsaturated linear backbone. The degree of unsaturation of the repeat backbone unit of the polymer is the same as that of the monomer. For example, with a norbornene reactant in the presence of an appropriate catalyst, the resulting polymer may be represented by:

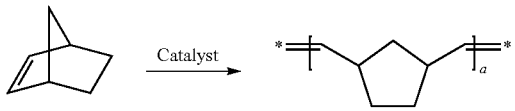

wherein a is the number of repeating monomer units in the polymer chain. For another example, with dienes such as dicyclopentadiene in the presence of an appropriate catalyst, the resulting polymer may be represented by:

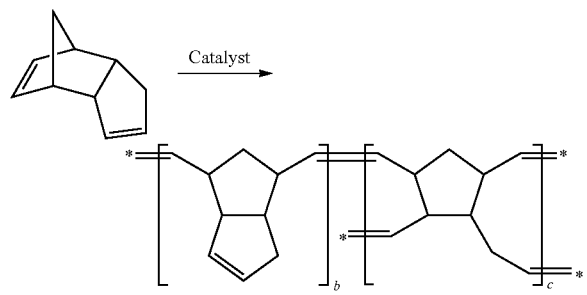

wherein b+c is the number of moles of polymerized monomer, and c/(b+c) is the mole fraction of monomer units which ring-open at both reactive sites. As shown by the above reaction, metathesis polymerization of dienes, trienes, etc. can result in a crosslinked polymer. Representative cycloalkene monomers, catalysts, procedures, etc. that can be used in metathesis polymerizations are described, for example, in Ivin; U.S. Pat. No. 4,400,340 (Klosiewicz); U.S. Pat. No. 4,751,337 (Espy et al.); U.S. Pat. No. 5,849,851 (Grubbs et al.); U.S. Pat. No. 6,800,170 B2 (Kendall et al.); and US 2007/0037940 A1 (Lazzari et al.).

The polymeric molds disclosed herein may comprise one or more polymers formed by ring opening metathesis polymerization of one or more cycloalkenes. In some embodiments, the polymer comprises: a multifunctional polycyclic monomer having two or more reactive double bonds, and/or a monofunctional cyclic monomer comprising one reactive double bond. As used herein, double bonds are considered reactive if they can undergo ROMP under typical reaction conditions as described in the above references. Exemplary multifunctional polycyclic monomers may be selected from the group consisting of dicyclopentadiene, tricyclopentadiene, tetracyclopentadiene, norbornadiene, tetracyclo[6,2,13,6,0$^{2,7}$]dodeca-4,9-diene, and derivatives thereof. Other examples of multifunctional polycyclic monomers include:

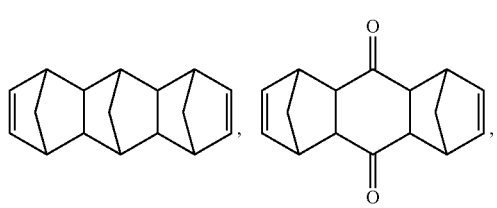

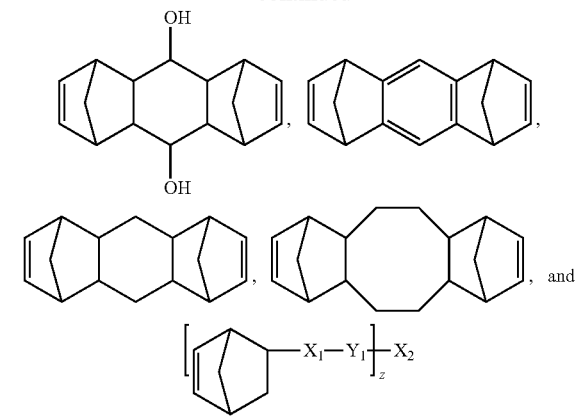

where $X_1$ is a divalent aliphatic or aromatic group with 0 to 20 carbon atoms; $X_2$ is a multivalent aliphatic or aromatic group with 0 to 20 carbon atoms; optional group $Y_1$ is a divalent functional group selected from the group consisting of esters, amides, ethers, and silanes; and z is 2 or greater. A mixture of multifunctional polycyclic monomers may be used.

The multifunctional diene monomer (or other multifunctional monomer with higher degree of unsaturation) may crosslink the polymer as described above for dicyclopentadiene. The degree to which crosslinking occurs depends on the relative amounts of different monomers and on the conversion of the reactive groups in those monomers, which in turn, is affected by reaction conditions including time, temperature, catalyst choice, and monomer purity. In general, at least some crosslinking is desired to maintain precise dimensions. The presence of crosslinking is indicated when the polymeric mold does not dissolve in some solvent such as toluene, but may swell in such solvents. Typically, the polymeric mold becomes stiffer as the amount of crosslinking increases, thus the amount of crosslinking desired may depend on the desired stiffness of the polymeric mold. In one example, if the polycyclic monomer comprises dicyclopentadiene, then from about 0.5 to about 50 mol % of dicyclopentadiene desirably ring-opens at both reactive sites to crosslink the polymer.

Cyclic monomers comprising a reactive double bond may be selected from the group consisting of norbornylene, ethylidenenorbornene, cyclooctene, and derivatives thereof with substituents including aliphatic groups, aromatic groups, esters, amides, ethers, and silanes. As used herein, cyclic monomer refers to monomers having at least one cyclic group and may include bicyclics and tricyclics. A mixture of cyclic monomers may be used. For example, the cyclic monomer may comprise norbornylene and a derivative of norbornylene comprising:

wherein $R_1$ is an alkyl group comprising from 1 to 20 carbon atoms, e.g. 6 carbon atoms. The cyclic monomer may also comprise a fluorinated cyclic monomer which may comprise the following:

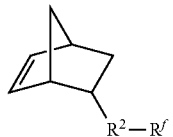

wherein $R^2$ is a divalent group selected from the group consisting of: a covalent bond, an alkyl group, an aromatic group, an ester, an amide, an ether, a silane derivative, and a sulfonamide; and $R^f$ is a fluorine-containing group, including a monovalent perfluoroalkyl-containing group or a perfluorooxyalkyl-containing group. The $R^f$ groups can contain straight chain, branched chain, or cyclic fluorochemical groups or any combination thereof and can optionally contain one or more catenary oxygen atoms in the carbon-carbon chain so as to form a carbon-oxygen-carbon chain (i.e. a perfluorooxyalkylene group). Fully-fluorinated groups are generally preferred, but hydrogen or other halo atoms can also be present as substituents, provided that no more than one atom of either is present for every two carbon atoms.

It may be additionally preferred that any $R^f$ group contain at least about 40% fluorine by weight, more preferably at least about 50% fluorine by weight. The terminal portion of the monovalent $R^f$ group is generally fully-fluorinated, preferably containing at least three fluorine atoms, e.g., $CF_3$—, $CF_3CF_2$—, $CF_3CF_2CF_2$—, $(CF_3)_2N$—, $(CF_3)_2CF$—, and $SF_5CF_2$—.

The combination —$R^2$—$R^f$ can consist of: —$C_nF_{(2n+1)}$ wherein n is from 1 to 10; —$CO_2R^3$ wherein $R^3$ comprises: —$C_mF_{(2m+1)}$ wherein m is from 1 to 10; —$(CH_2)_pC_qF_{(2q+1)}$; —$(CH_2)_rN(R^4)SO_2C_sF_{(2s+1)}$ wherein r is from 1 to 6, $R^4$ is —$CH_3$ or —$C_2H_5$, and s is from 1 to 10; —$CH_2$—$OC(O)$—$C_tF_{(2t+1)}$ wherein t is from 1 to 10; and —$CO2(CH_2)_u$NH-$COCF_2(CF_3)[OCF_2CF(CF_3)]_vF$ wherein u is 1 to 6 and v is 1 to 50

In some embodiments, the polymeric mold may comprise a mixture of norbornylene, dicyclopentadiene, and a fluorinated cyclic monomer. For example, embodiments include a mixture of norbornylene, 5-hexyl-norbornylene, dicyclopentadiene, and the above fluorinated cyclic monomer wherein $R^2$—$R^f$ is —$CO_2(CH_2)_2N(Me)SO_2C_4F_9$. Embodiments also include a mixture of norbornylene, 5-hexyl-norbornylene, dicyclopentadiene, and the above fluorinated cyclic monomer wherein $R^2$—$R^f$ is —$CO_2(CH_2)_2C_6F_{13}$. Embodiments also include a mixture of 5-hexyl-norbornylene, dicyclopentadiene, and the above fluorinated cyclic monomer wherein $R^2$—$R^f$ is —$CO_2(CH_2)_2N(Me)SO_2C_4F_9$. Embodiments also include a mixture of 5-hexyl-norbornylene, dicyclopentadiene, and the above fluorinated cyclic monomer wherein $R^2$—$R^f$ is —$CO2(CH_2)_2NHCOCF_2(CF_3)[OCF_2CF(CF_3)]_vF$.

The relative amounts of monomers used to make the polymer mold may vary depending on the particular monomers and desired properties of the polymeric mold. The polymer may comprise: from about 0 to about 100 wt. % of the multifunctional polycyclic monomer, and from about 0 to about 100 wt. % of the cyclic monomer, both relative to the total weight of the polymer. When the molded article is relatively flexible, a stiffer mold can be desirable, and in this case, the polymer may preferably comprise: from about 50 wt. % to about 100 wt % of the multifunctional polycyclic monomer and from about 0 wt % to about 50 wt % of the monofunctional cyclic monomer, or preferably, between about 50 and 75 wt. % of the multifunctional polycyclic monomer and between about 25 and 50 wt % of the monofunctional monomer, both relative to the total weight of the polymer. When the molded article is relatively stiff, a more flexible mold can be desirable. In this case, the polymer may preferably comprise: from about 20 wt. % to about 80 wt % of the polycyclic monomer and from about 80 wt % to 20 wt % of the cyclic monomer. In some embodiments, the mole ratio of polycylic monomer to cyclic monomer comprises from about 1:3 to about 1:7. In chosing the relative amounts of comonomers for producing a flexible mold, the contribution of each monomer to the glass transition temperature of the mold can be used to select an appropriate ratio. The combination of the comonomers should produce a flexible mold material with a glass transition temperature between about −100° C. and about 40° C., and more preferably between about −20° C. and about 25° C.

In embodiments in which a fluorinated cyclic monomer is used, this monomer may comprise from about 0.1 to about 25 wt. % of the polymer relative to the total weight of the polymer. Fluorinated cyclic monomers may be used to increase the releasability of articles from the polymeric mold. The concentration of the fluorinated comonomer should be chosen such that it is high enough to reduce the surface energy of the mold material, but low enough that macrophase separation of the fluorinated material does not occur. Generally, monomers with higher fluorine content will be required in lower amounts than monomers with lower fluorine content.

The polymer may comprise: from about 0 to about 99 wt. % of the multifunctional polycyclic monomer, from about 0.1 to about 25 wt. % of the fluorinated cyclic monomer, and from about 0 to about 99 wt. % of the monofunctional cyclic monomer, all relative to the total weight of the polymer. When a stiff mold is used with a flexible molded article, the polymer may also comprise: from about 50 wt. % to about 100 wt % of the multifunctional polycyclic monomer, from about 0.1 to about 10 wt. % of the fluorinated cyclic monomer, and from about 0 wt % to about 50 wt. % of the monofunctional cyclic monomer. When a flexible mold is desired for use with a relatively stiff molded article, the polymer may also comprise: from about 20 wt. % to about 80 wt % of the multifunctional polycyclic monomer, from about 0.1 to about 10 wt. % of the fluorinated cyclic monomer, and from about 20 wt. % to about 80 wt. % of the monofunctional cyclic monomer, all relative to the total weight of the polymer. More preferably, the polymer may comprise from about 20 wt. % to about 40 wt % of the multifunctional polycyclic monomer, from about 0.1 to about 6 wt. % of the fluorinated cyclic monomer, and from about 60 wt. % to about 80 wt. % of the monofunctional cyclic monomer, all relative to the total weight of the polymer. The combination of comonomers may also be chosen to produce a flexible mold material with a glass transition temperature between about −100° C. and about 40° C., and more preferably between about −20° C. and about 25° C.

The polymeric mold is prepared from a monomer composition. Besides the monomers described above, the monomer composition comprises a metathesis catalyst, for example, catalysts described in the above references. Transition metal carbene catalysts such as ruthenium, osmium, and rhenium catalysts may be used, including versions of Grubbs catalysts and Grubbs-Hoveyda catalysts; see, for example, U.S. Pat. No. 5,849,851 (Grubbs et al.).

The metathesis catalyst can also be a transition metal catalyst such as tungsten or molybdenum, including their halides, oxyhalides, and oxides. One particularly preferred catalyst is $WCl_6$. Often, the transition metal catalyst is employed in a two part system in which one part is a solution that contains the catalyst, and the other part is a solution that contains an activator. Upon combining the two solutions, ROMP occurs. Activators can include organoaluminum compounds, organotin compounds, and organolead compounds. Some of the preferred activators specifically include trialkylaluminum, dialkylaluminumhalides, alkylaluminumdihalides, tetraalkyltin, and alkyltinhydrides. One particularly preferred catalyst system comprises $WCl_6/(C_2H_5)_2AlCl$. The choice of particular catalyst system and the amount used may depend on the particular monomers being used, as well as on desired reaction conditions, desired rate of cure, and so forth. In particular, it can be desirable to include $WCl_6$ in amounts from about 1 to about 0.005 wt. %, or more preferably from 0.3 to 0.03 wt. %, and most preferably from 0.2 to 0.05 wt. %, all relative to the total weight of the polymer. The amount of $(C_2H_5)_2AlCl$ can be from about 50 mol % to about 5000 mol %, or more preferably from 100 mol % to 1500 mol %, or most preferably from 500 mol % to 1200 mol %, all relative to the amount of $WCl_6$.

A third component, such as water, alcohols, oxygen, or any oxygen-containing compound, can be used to increase the activity of the catalyst system as described in Ivin. This component can also be used to improve to solubility of the catalyst in the monomer solution. One example of a third component comprises alkyl-substituted phenols which are included in the catalyst solution. By reacting the phenol with the $WCl_6$ prior to adding a hydrocarbon monomer such as dicyclopentadiene, the catalyst will dissolve in the monomer. Particularly preferred phenols are nonylphenol and 4-tertbutylphenol.

In the catalyst solution, the $WCl_6$ catalyst precursor may cause the polymerization of the monomer before being mixed with the organoaluminum or organotin activator solution. To prevent this premature polymerization, a chelator or Lewis base stabilizer can be added to the $WCl_6$ solution as taught in U.S. Pat. No. 4,400,340 (Klosiewicz et al). Particularly preferred stabilizers are 2,4-pentanedione or benzonitrile. This can be added at 50 mol % to 300 mol % and more preferably from 100 mol % to 200 mol % relative to the $WCl_6$.

It is also taught in U.S. Pat. No. 4,400,340 (Klosiewicz et al) that the addition of a Lewis base to the activator solution can slow the gelation of the mixed monomer composition, thus allowing time to fill the mold. One preferred Lewis base for this purpose is butyl ether. Another preferred Lewis base moderator which is beneficial in that it can be polymerized into the ROMP polymer is norborn-2-ene-5-carboxylic acid butyl ester. The Lewis base moderator can be included from about 0 mol % to 500 mol %, and more preferably from 100 mol % to 300 mol % relative to the organoaluminum or organotin activator.

Additionally, a halogen-containing additive can be included to increase conversion of monomer during the polymerization, as taught in U.S. Pat. No. 4,481,344 (Newburg et al). This halogen-containing compound can be included from 0 mol % to 5000 mol %, and preferably from 500 mol % to 2000 mol % all relative to the $WCl_6$. A particularly preferable halogen containing additive is ethyl trichloroacetate.

Other additives can include plasticizers, inorganic fillers, and antioxidants, preferably phenolic antioxidants.

To maximize dimensional stability of the mold, it is desirable that no solvent be included in the formulations. If solvent is used to help initially dissolve some component of the catalyst system, such as the $WCl_6$, it is desirable to remove the solvent under vacuum before polymerizing the mixture.

In formulating the two reactive streams containing catalyst and activator, respectively, the comonomers can be distributed between the reactive streams arbitrarily. The volumes of catalyst solution and activator solution to be mixed can be have ratios in the range of about 0.01 to about 100, and more preferably from about 0.1 to about 10, and most preferably about 1:1.

Both the $WCl_6$ catalyst precursor and the $(C_2H_5)_2AlCl$ activator are sensitive to ambient moisture and oxygen, so it is preferable to maintain the reactive solutions under inert conditions. Once mixed, the catalyst solution can be injected into an air-filled mold as long the polymerization is rapid and exposure to air is minimized. Preferably, the mold can be purged with an inert gas such as nitrogen before introducing the monomer composition. The polymerization can occur at room temperature, or heat can be used to help accelerate the polymerization.

The polymeric molds disclosed herein are made using a master tool. The master tool may be shaped, configured, etc. so as to provide a variety of different types of polymeric molds which can in turn be used to make a variety of molded articles for many different types of applications. In general, the master tool is shaped to provide a positive mold of the final molded article, with the polymeric mold being shaped as a negative mold thereof. In some embodiments, for example, when a film-like molded article is to be molded, the master tool may simply need to provide a structured surface with optional side walls to contain the monomer composition before sufficient polymerization has taken place. The monomer composition may be coated, poured, etc. to completely and/or partially fill any recesses.

In some embodiments, the master tool may comprise an injection mold or a compression mold. In this case, the mold may comprise two halves which mate together. For injection molding, the monomer composition may be injected via an injection port into a cavity or cavities of the master tool, and there is typically some output port for air, nitrogen, etc. to escape. Filling of the cavity may be facilitated by vacuum attached via the output port. For compression molding, a system of runners and sprues are typically provided to facilitate a complete filling of a cavity or cavities of the master tools as well as to enable release of the molded article from the mold.

The three-dimensional topography of at least one surface of the master tool may comprise one or more features that may vary in terms of shape, size, and distribution across the surface. The features may be described as recesses, cavities, relief structures, microlens, grooves, channels, etc., and they may comprise rectangular, hexagonal, cubic, hemispherical, conical, pyramidal shapes, or combinations thereof. In some embodiments, the three-dimensional topography of the surface of the master tool comprises at least one microstructured feature having a dimension of less than about 2 mm, or less than about 500 um. In some embodiments, the three-dimensional topography of the surface of the master tool comprises a plurality of microstructured features, each feature having a dimension of less than about 2 mm, or less than about 500 um. Particular shapes and surface structures are described below for the molded articles.

The desired feature or features may be imparted to the surface of the master tool by any suitable means, such as by drilling, machining, laser drilling, laser ablation, microcontact printing, lithography, stamping, water jet machining, casting, etching, die punching, diamond turning, engraving, knurling, and the like. The desired feature or features may also be imparted to the surface of the master tool by a process referred to as multiphoton curing, see for example, WO 2007/137102 A1 (Marttila et al.).

The master tool may be flexible or rigid. Useful materials that may be used to make the master tool include metal, steel, ceramic, polymeric materials (including thermoset and thermoplastic polymeric materials), or combinations thereof. The materials forming the master tool must have sufficient integrity and durability to withstand the particular monomer compositions to be used as well as any heat that may be applied thereto or generated by the polymerization reaction. The materials forming the master tool must also be amenable to structuring as described above. The master tool is desirably inexpensive to manufacture, has a long service life, consistently produces material of acceptable quality, and allows for variations in process parameters.

The drawing shows an exemplary process flow diagram for making the polymeric molds disclosed herein. Master tool 10 having surface 12 is provided. Monomer composition 14 is provided and may comprise, as described above: a polycyclic monomer having two or more reactive double bonds, and/or a cyclic monomer having a reactive double bond. Surface 12 of the master mold is at least partially contacted with the monomer composition. As shown in the drawing, the master tool provides a cavity which is filled with the monomer composition. The monomer composition is then polymerized such that ROMP occurs. The resulting polymer forms polymeric mold 16. The polymeric mold is separated from the master tool. As described above, the polymeric mold provides a negative mold of the desired molded article.

The drawing also shows an exemplary process flow diagram for making the molded articles. Polymeric mold 16 is provided. Liquid composition 18 is provided and brought into contact with at least a portion of the polymeric mold. The liquid composition is then formed into the molded article 20. The molded article is separated from the polymeric mold.

Many different types of materials may be used as the liquid composition. In some embodiments, the liquid composition comprises one or more monomers, and forming the liquid composition into a molded article comprises application of heat and/or actinic radiation to polymerize the one or more monomers. Many kinds of these curable systems are known and include (meth)acrylates, urethanes, silicones, epoxies, and combinations thereof. In some embodiments, the liquid composition comprises a flowable or thermoplastic material that is liquefied upon heating. In this case, forming the liquid composition into a molded article comprises cooling the liquid composition. Examples of thermoplastic materials include polyolefins, poly(meth)acrylates, polyurethanes, polystyrene, polycarbonates, and polyesters.

In some embodiments, the master tool is shaped to provide a molded article that is an optical article. Optical articles that may be made include light guides or waveguides designed to guide waves, such as light, electromagnetic waves, or sound waves. Light guides typically comprise one or more layers wherein a surface of the light guide comprises one or more light extraction features; see for example, light guides described in U.S. Patent Appl. Publ. No. 2008/0232135 A1 (Kinder et al.) Optical articles that may also be made include brightness enhancement films, sometimes referred to as prismatic films, which are designed to redirect light through reflection and refraction; see for example, U.S. Pat. No. 5,828,488 (Ouderkirk et al.) and U.S. Pat. No. 5,919,551 (Cobb, Jr. et al.). Both light guides and brightness enhancement films generally comprise a polymeric layer having a plurality of microstructured features on a surface of the layer. Other types of articles that may be made include retroreflective films such as those comprising cube corner sheeting, see for example, U.S. Pat. No. 5,691,846 (Benson, Jr. et al). Retroreflective films generally comprise a polymer layer having a multitude of interconnected cube corner elements on a surface of the layer such that incident light is retroreflected. Other types of articles that may be made include microfluidic devices having microchannels (less than 1 mm diameter) formed on silicon, glass, or quartz and through which liquids and/or gases can flow.

In some embodiments, the master tool is shaped to provide a molded article comprising a structured abrasive article. One example of a structured abrasive article comprises a plurality of abrasive composites, each of the abrasive composites comprising a plurality of abrasive grains dispersed in a binder. The abrasive composites may be shaped, e.g., as pyramids, prisms, or curvilinear shapes, on a major surface of the structured abrasive article. Examples of abrasive grains which may be used include aluminum oxide, silicon carbide and the like. Examples of binders which may be used include curable resins such as urethanes, epoxies, and (meth)acrylates. One example of a structured abrasive article is disclosed in U.S. Pat. No. 5,152,917 (Pieper et al.).

In some embodiments, the master tool is shaped to provide a molded article comprising a friction control article. The friction control article provides high frictional properties and good gripping performance. Useful friction control articles comprise a soft microstructured surface having an array of flexible upstanding stems of a variety of shapes. As such, friction control articles may comprise an elastomeric material such as a block polymer of some combination of styrene, isoprene, and/or butadiene. Useful friction control articles may comprise a plurality of stems, each stem providing a static coefficient of friction when dry of at least about 0.6. Examples of friction control articles are disclosed in U.S. Pat. No. 6,610,382 B1 (Kobe et al.) and U.S. Pat. No. 6,904,615 B2 (Kobe et al.).

In some embodiments, such as for the structured abrasive articles, a backing may be applied to the liquid composition such that the molded article is adhered or attached to the backing Materials suitable for backings include polymeric films, paper, cloth, metallic film, fiber, nonwoven substrates, and combinations and derivatives thereof.

EXAMPLES

All materials were obtained from Aldrich Chemicals (Milwaukee, Wis.) unless stated otherwise.
Test Methods
Tensile Strength (ASTM D638)

A ⅛ in. thick sample was cut into dogbone specimens having the dimensions specified in ASTM D638, Type IV. The tensile strength was measured by testing the specimens to failure on a Sintech load frame using an initial grip separation of 3.5 in. and a test speed of 20 in/min. To measure elongation, the dogbone samples were tested using an initial grip separation of 1.25 in. and a test speed of 20 in./min. The elongation was based on the separation of the grips. Marks were added to the samples to identify any slippage in the grips during the test, and any observed slippage was accounted for after the test.
Tear Strength (ASTM D624)

A ⅛ in. thick sample was cut into crescent shape tear specimens using die B as described in ASTM D624. The sample was also nicked by the die. The samples were then tested to failure using a Sintech load frame with an initial grip separation of 3 in. and a test rate of 20 in./min.
Preparation of Materials

Preparatory Example 1

MeFBSE-norbornene (fluoromonomer 1)

A mixture of $C_4F_9N(CH_3)CH_2CH_2OC(O)CH=CH_2$ [121.78 g, 0.296 mol, prepared as described in WO 01/30873A1, Example 2, part A and B (Savu et al)], cyclopentadiene (23.36 g, 0.353 mol, freshly prepared from dicyclopentadiene), and chloroform (120 mL) was mixed at room temperature for 10 minutes. The solution was then heated to 55° C. for 20 hours. The mixture was then placed under vacuum to remove the solvent. The product was obtained as a waxy solid (yield 140.16 g, 97%).

Preparatory Example 2

5-Norbornene-2-(3,3,4,4,5,5,6,6,7,7,8,8,8-tridecafluoro-octyl)ester (fluoromonomer 2)

A mixture of 3,3,4,4,5,5,6,6,7,7,8,8,8-tridecafluoro-octyl acrylate (25.00 g, 60 mmol) and cyclopentadiene (4.78 g, 72 mmol, freshly prepared from dicyclopentadiene) were mixed at room temperature for 2 hours. The solution was then heated to 55° C. for 17 hours. The mixture was then placed under vacuum (2 mmHg) at 55° C. for 2 hours. The product was obtained as an orange oil (yield 28.20 g, 98%).

Preparatory Example 3

Preparation of W Catalyst Solution

An oven-dried 1 L flask under nitrogen was charged with $WCl_6$ (4.00 g, 0.010 mol), nonylphenol (2.24 g, 0.010 mol), and about 100 mL of anhydrous toluene. This mixture was stirred for four hours while purging with nitrogen Anhydrous dicyclopentadiene (DCPD, 500 mL, 3.67 mol) and 2,4-pentanedione (2.0 g, 0.020 mol) were then added. The solution was placed under vacuum and stirred for 2.5 h at 40° C. to remove the toluene. Anhydrous DCPD was added to bring the total volume to 500 mL.

Preparatory Example 4

Formulation with 5 wt % Fluoromonomer 1

Mixture A
An oven-dried 250 mL Erlenmeyer flask was charged with fluoromonomer 1 (5.00 g, 0.019 mol). It was then capped with a septum and purged with nitrogen. Using a syringe, 5-hexyl-2-norbornene (50 mL, 0.243 mol) was added. The solution was heated in a 120° C. oven for approximately 20 min to dissolve fluoro-monomer 1. The flask was removed from the oven and allowed to cool for a few minutes. Ethyl trichloroacetate (1.4 mL, 0.010 mol) and 50 mL of the catalyst solution from Preparatory Example 3 were then added.
Mixture B
Fluoromonomer 1 (5.00 g, 0.019 mol) was similarly charged to a separate oven-dried 250 mL Erlenmeyer flask which was then capped with a septum and purged with nitrogen. DCPD (11.5 mL, 0.084 mol) and 5-hexyl-2-norbornene (88.5 mL, 0.427 mol, prepared according to Muller, K., et al., *Macromol. Chem. Phys.*, 2006, 207, 193-200) were added, and the mixture was heated at 120° C. to dissolve fluoromonomer 1. After cooling, dibutyl ether (6.2 mL, 0.046 mol) and diethylaluminum chloride (1.9 mL, 0.015 mol) were added.

Preparatory Example 5

Formulation with 15 wt % Fluoromonomer 1

Mixture A
Fluoromonomer 1 (3.75 g, 0.014 mol) and norbornylene (3.125 g, 0.033 mol) were put into an oven-dried flask which was then capped with a septum and purged with nitrogen. 5-hexyl-2-norbornene (6.1 mL, 0.029 mol) was added, and the mixture was heated until the monomers had all dissolved. Ethyl trichloroacetate (0.35 mL, 0.003 mol) and the W-catalyst solution from Preparatory Example 3 (12.6 mL) were added after the solution had cooled.
Mixture B
In an oven-dried flask, fluoromonomer 1 (3.75 g, 0.014 mol) and norbornylene (Aldrich, 9.38 g, 0.100 mol) were combined, and the flask was capped and purged with nitrogen. Dicyclopentadiene (2.9 mL, 0.021 mol) and 5-hexyl-2-norbornene (8.3 mL, 0.040 mol) were added, and the mixture was heated to dissolve all the monomers. After cooling, butyl ether (1.55 mL, 0.011 mol) and diethylaluminum chloride (1.0 mL, 0.008 mol) were added.

Preparatory Example 6

Formulation with 15 wt % Fluoromonomer 2

Mixture A
Norbornylene (1.875 g, 0.0199 mol) was put into an oven-dried flask which was then capped with a septum and purged with nitrogen. Fluoromonomer 2 (2.25 g, 0.009 mol), 5-hexyl-2-norbornene (3.6 mL, 0.018 mol), ethyl trichloroacetate (0.2 mL, 0.002 mol), and the W-catalyst solution from Preparatory Example 3 (7.6 mL) were added.
Mixture B
An oven-dried flask was charged with norbornylene (5.625 g, 0.060 mol) and capped and purged with nitrogen. Fluoromonomer 2 (2.25 g, 0.009 mol), dicyclopentadiene (1.7 mL, 0.013 mol), 5-hexyl-2-norbornene (5.0 mL, 0.024 mol), butyl ether (0.9 mL, 0.007 mol) and diethylaluminum chloride (0.3 mL, 0.002 mol) were added.

Preparatory Example 7

Fluoromonomer 3

HFPO refers to the end group $F(CF(CF_3)CF_2O))_dCF(CF_3)-$, wherein d averages from 4 to 20. HFPO—$CONHCH_2CH_2OCOCH=CH_2$ (HFPO-AEA) was prepared as described in Preparation 31A of US 2006/0216500 (Klun et al.). A mixture of HFPO-AEA (40.00 g, 0.029 mol) and cyclopentadiene (2.73 g, 0.041 mol, freshly prepared from dicyclopentadiene) was mixed at room temperature for 30 minutes. The mixture was then heated to 55° C. for 4 hours. The mixture was then placed under vacuum to remove excess cyclopentadiene. The product was obtained as a yellow liquid (yield 40.17 g, 97%).

Preparatory Example 8

Norborn-2-ene-5-carboxylic acid butyl ester

A mixture of butyl acrylate (41.62 g, 0.032 mol) and cyclopentadiene (31.76 g, 0.48 mol, freshly prepared from dicyclopentadiene) was stirred in a flask with cooling in a cold water bath. After 1 hour, the mixture was stirred at 55° C. for 30 minutes. The mixture was then distilled under reduced pressure (60-65° C. @0.4 mmHg) to give the product as a colorless oil (yield 70.29 g, 93%).

Preparatory Example 9

Formulation with No Fluoromonomer

Mixture A
An oven-dried 25 mL round bottom flask was charged with norborn-2-ene-5-carboxylic acid butyl ester (0.15 g, 0.00077 mol). It was then capped with a septum and purged with nitrogen. Using a syringe, 5-hexyl-2-norbornene (5.4 mL, 0.026 mol) was added. The solution was heated in an 85° C. oven for approximately 30 min. The flask was removed from the oven and allowed to cool for a few minutes. Ethyl trichloroacetate (0.14 mL, 0.0010 mol) and 5.0 mL of the catalyst solution from Preparatory Example 3 were then added.

Mixture B

Norborn-2-ene-5-carboxylic acid butyl ester (0.15 g, 0.00077 mol) was charged to a separate oven-dried 25 mL round bottom flask which was then capped with a septum and purged with nitrogen. Dicylopentadiene (7.3 mL, 0.054 mol) and 5-hexyl-2-norbornene (3.0 mL, 0.015 mol) were added, and the mixture was heated at 85° C. for approximately 30 min. After cooling, diethylaluminum chloride (0.19 mL, 0.0015 mol) was added.

Preparatory Example 10

Formulation with 0.2% Fluoromonomer 3

Mixture A

An oven-dried 25 mL round bottom flask was charged with fluoromonomer 3 (0.02 g) and norborn-2-ene-5-carboxylic acid butyl ester (0.15 g, 0.00077 mol). It was then capped with a septum and purged with nitrogen. Using a syringe, 5-hexyl-2-norbornene (5.4 mL, 0.026 mol) was added. The solution was heated in an 85° C. oven for approximately 30 min. to dissolve the fluoromonomer. The flask was removed from the oven and allowed to cool for a few minutes. Ethyl trichloroacetate (0.14 mL, 0.0010 mol) and 5.0 mL of the catalyst solution from Preparatory Example 3 were then added.

Mixture B

Fluoromonomer 3 (0.02 g) and norborn-2-ene-5-carboxylic acid butyl ester (0.15 g, 0.00077 mol) were charged to a separate oven-dried 25 mL round bottom flask which was then capped with a septum and purged with nitrogen. Dicylopentadiene (7.3 mL, 0.054 mol) and 5-hexyl-2-norbornene (3.0 mL, 0.015 mol) were added, and the mixture was heated at 85° C. for approximately 30 min. After cooling, diethylaluminum chloride (0.19 mL, 0.0015 mol) was added.

Preparatory Example 11

Formulation with 0.2% Fluoromonomer 3 and 6% Fluoromonomer 1

Mixture A

An oven-dried 25 mL round bottom flask was charged with fluoromonomer 3 (0.02 g), fluoromonomer 1 (0.60 g), and norborn-2-ene-5-carboxylic acid butyl ester (0.15 g, 0.00077 mol). It was then capped with a septum and purged with nitrogen. Using a syringe, 5-hexyl-2-norbornene (4.8 mL, 0.023 mol) was added. The solution was heated in an 85° C. oven for approximately 30 min. to dissolve the fluoromonomer. The flask was removed from the oven and allowed to cool for a few minutes. Ethyl trichloroacetate (0.14 mL, 0.0010 mol) and 5.0 mL of the catalyst solution from Preparatory Example 3 were then added.

Mixture B

Fluoromonomer 3 (0.02 g), fluoromonomer 1 (0.60 g), and norborn-2-ene-5-carboxylic acid butyl ester (0.15 g, 0.00077 mol) were charged to a separate oven-dried 25 mL round bottom flask which was then capped with a septum and purged with nitrogen. Dicylopentadiene (7.3 mL, 0.054 mol) and 5-hexyl-2-norbornene (2.5 mL, 0.012 mol) were added, and the mixture was heated at 85° C. for approximately 30 min. After cooling, diethylaluminum chloride (0.19 mL, 0.0015 mol) was added.

Comparative Example 1

A ⅛ in. thick sheet of SILASTIC E silicone rubber (Dow Corning, Midland, Mich.) was prepared as described in Dow's product information. A mold was prepared using two plates of glass and a sheet of silicone that was ⅛" thick and had a 6" by 8" rectangular opening. SILASTIC E resin (60 g) and SILASTIC E curing agent (6.0 g) were combined in a plastic cup and mixed using a DAC 150 FV SPEED MIXER from FLACKTEK (Landrum, S.C.). Two of these 66 g samples were poured into the rectangular opening on one of the glass plates. This sample was then degassed for five minutes under vacuum. The second piece of glass was then placed on top of the sample, and the mold was clamped with binder clips. The sample was cured for 17 h at room temperature followed by 4.5 h at 50° C.

Example 1

To prepare a mold, a ⅛ in. thick polytetrafluoroethylene (PTFE) sheet was cut to have a rectangular opening 6 in. by 8 in. This spacer was clamped between two plates of glass, one of which had a ⅛ in. diameter hole in one corner. The resulting mold cavity was purged with nitrogen using a needle through the hole in the glass. A 60 mL syringe was filled with 54 mL of Mixture A from Preparatory Example 4. Another syringe was similarly filled with 54 mL of Mixture B from Preparatory Example 4. These two syringes were placed in a syringe pump and connected to a static mixer 5 in. long with 19 mixing elements. A needle connected to the end of the static mixer was placed through the hole in the corner of the mold, and the syringe pump was used to deliver the entire contents of the syringes to the mold over the course of less than 15 s. After about 90 s, the mold became warm due to the exotherm of the cure. After 5 min, the resulting polymer was removed from the mold and cured in a 120° C. oven for 1 h.

The resulting tensile strength, elongation, and tear strength for Example 1 and the comparative properties for Comparative Example 1 are shown in Table 1.

TABLE 1

| Sample | Tensile Strength (PSI) | Elongation (%) | Tear Strength (pounds force/in) |
|---|---|---|---|
| Ex. 1 | 1100 | 260 | 150 |
| Comp. Ex. 1 | 400 | 230 | 130 |

Example 2

Molds from Preparatory Example 4

Mixture A from Preparatory Example 4 (22 mL) was loaded into a syringe. A separate syringe was loaded with Mixture B from Preparatory Example 4 (22 mL). A master tool was prepared using a nickel-plated pattern set into the bottom of an aluminum box with no top. A piece of glass with a ⅛ in. diameter hole was taped over the top of the aluminum box, and the cavity was purged with nitrogen. Analogously to the process described in Example 1, the two solutions were injected into the mold with a syringe pump through a static mixer. The sample exothermed in 1-2 min. and was removed from the mold after at least 3 min. The mold was then put into a 120° C. oven for approximately 20 min. to post cure.

Example 3

Photocured Silicone in ROMP-Based Molds

The back of a mold as formed in Example 2 was fastened to an aluminum plate. A photocurable silicone solution was formulated with 20:1 by weight of VQM-135 resin (Gelest, Morrisville, Pa.) and Syl-Off 7678 (Dow Corning, Midland, Mich.), and with 10 ppm of Pt in the form of $(MeCp)PtMe_3$. The mold cavity was then filled with this photocurable silicone formulation, which was degassed for 5-7 min. A polyester liner was then added over the top of the silicone and excess silicone resin was squeezed out. Glass was placed over the polyester liner, and the assembly was heated to 80° C. in an oven. The silicone was then exposed under a UV lamp for 10 minutes and returned to the 80° C. oven for 20 min. It was removed and allowed to cool for 3-5 min. The release liner was removed, and the silicone was carefully removed from the mold. The mold could then be cleaned and reused. This cycle was repeated 12 times with no obvious decrease in performance of the molds.

Example 4

A 6 mL vial was capped with a septum and purged with nitrogen. 1 mL of each of Mixture A and Mixture B from Preparatory Example 5 were injected, and the vial was shaken to mix. The sample exothermed in less than 2 min.

Example 5

A 6 mL vial was capped with a septum and purged with nitrogen. Mixture A and Mixture B from Preparatory Example 6 (0.5 mL of each) were injected, and the vial was shaken to mix. The sample exothermed in less than 3 min.

Example 6

Microreplication Using Preparatory Example 5

A 4 in. by 5 in. piece of glass was covered with a piece of micropatterned brightness enhancement film (BEF). A rectangular piece of ⅛ in. thick silicone rubber sheeting was cut to have a rectangular opening 3 in. by 4 in. and placed on the film. A piece of glass with a ⅛ in. diameter hole in one corner was placed on top of the silicone to create a mold cavity ⅛ in. by 3 in. by 4 in. The mold was then purged with nitrogen. Mixture A and Mixture B from Preparatory Example 5 were placed into separate syringes. The two syringes were put in a syringe pump and equipped with a static mixer. The solutions were injected through the static mixer and into the mold via the hole in the glass. The sample exothermed, and after 5 min., the piece of BEF and the piece of glass it was contacting were removed. The sample was then post cured in a 120° C. oven for 1 h.

The resulting micropatterned surface was placed under a 1/16 in. thick piece of silicone rubber sheeting with rectangular opening 1.75 in. by 2.25 in. This cavity was then filled with a curable urethane acrylate solution comprising Sartomer CN981 (87.6 wt. %) available from Sartomer Co., Exton, Pa., hexanediol diacrylate (12.0 wt. %), and LUCIRIN TPO-L (0.4 wt. %) from BASF, Ludwigshafen, Germany. The mold was covered on top with a piece of polyester film and cured under a Norlux 375 nm LED array available from Norlux Corp., Carol Stream, Ill., for 60 s.

The urethane acrylate appeared to be fully cured and could be removed from the mold. However, removing the urethane acrylate required enough force to cause visible defects in the mold. Examination under a light microscope confirmed that the BEF pattern had been transferred to the cured urethane acrylate.

Example 7

Microreplication Using Preparatory Example 6

A micropatterned surface was prepared using Mixture A and Mixture B from Preparatory Example 6 as described in Example 6. The resulting micropatterned surface was placed under a 1/16 in. thick piece of silicone rubber sheeting with rectangular opening 1.75 in. by 2.25 in. This cavity was then filled with a curable urethane acrylate solution comprising Sartomer CN981 (87.6 wt %), hexanediol diacrylate (12.0 wt %), and LUCIRIN TPO-L (0.4 wt %). The mold was covered on top with a piece of polyester film and cured under a Norlux 375 nm LED array for 60 s.

The sample was able to be removed from the mold without causing damage to the mold. Additional urethane acrylate specimens were made off the same mold with the same process. After 7 cycles the mold was undamaged.

Example 8

Microreplication Using Preparatory Example 9

A 3 in. by 4 in. piece of glass was covered with a piece of micropatterned brightness enhancement film (BEF). A rectangular piece of ⅛ in. thick silicone rubber sheeting was cut to have a rectangular opening 2.3 in. by 3.3 in. and placed on the film. A polyester film was then placed on the silicone mold. A piece of glass with a ⅛ in. diameter hole in one corner was placed on top of the film to create a mold cavity ⅛ in. by 2.3 in. by 3.3 in. The mold was then purged with nitrogen. Between 10.0 and 10.5 mL of each of Mixture A and Mixture B from Preparatory Example 8 were placed into separate syringes. The two syringes were put in a syringe pump and equipped with a static mixer. The solutions were injected through the static mixer and into the mold via the hole in the glass and hole through the polyester film. The sample exothermed, and after 30 min., the ROMP polymer was removed from the mold. The sample was then post cured in a 100° C. oven for 30 min.

A curable urethane acrylate solution comprising Sartomer CN966J75 (99.6 wt. %) available from Sartomer Co., and LUCIRIN TPO-L (0.4 wt. %) was poured onto the surface of the resulting micropatterned ROMP surface. A piece of polyester film was placed on the urethane acrylate, and this was spread with knife coater to make a layer between 0.61 and 1.18 mm thick. This was cured under a Norlux 375 nm LED array for 60 s. This poly(urethane acrylate) layer was peeled off and discarded. A second poly(urethane acrylate) layer was then cast and cured identically.

The resulting poly(urethane acrylate) layer was cut into ½ in. wide strips with the microreplicated prisms crossing the transverse direction of the strip. These strips were then removed from the micropatterned ROMP surface using a 180° peel tester (Instrumentors, Inc., Model 3M90) equipped with a 10 lbf load cell. The testing was done at 12 in./min. and the peel force was averaged over 5 sec. The average peel force for six specimens was 22.6 oz. The surface of the resulting poly(urethane acrylate) samples possessed a patterned prism geometry.

Example 9

Microreplication Using Preparatory Example 10

The procedure used with Example 8 was repeated using Preparatory Example 10. The average peel force for removing 6 specimens of poly(urethane acrylate) from the resulting ROMP molds was 7.3 oz. The surface of the resulting poly(urethane acrylate) samples possessed a patterned prism geometry.

Example 10

Microreplication Using Preparatory Example 11

The procedure used with Example 8 was repeated using Preparatory Example 11. The average peel force for removing 5 specimens of poly(urethane acrylate) from the resulting ROMP molds was 14.8 oz. The surface of the resulting poly(urethane acrylate) samples possessed a patterned prism geometry.

What is claimed is:

1. A polymeric mold comprising a polymer formed by ring opening metathesis polymerization of:
   a polycyclic monomer having two or more reactive double bonds, and
   a cyclic monomer comprising a reactive double bond, the cyclic monomer comprising a fluorinated cyclic monomer comprising:

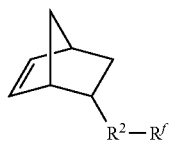

wherein $R^2$ is selected from the group consisting of: a covalent bond, an alkyl group, an aromatic group, an ester, an amide, an ether, and a sulfonamide: and $R^f$ is a fluorine-containing group, including a monovalent perfluoroalkyl-containing group or a perfluorooxyalkyl-containing group.

2. The polymeric mold of claim 1, the polycyclic monomer selected from the group consisting of dicyclopentadiene, tricyclopentadiene, tetracyclopentadiene, norbornadiene, tetracyclo[6,2,13,6,0$^{2,7}$]dodeca-4,9-diene, and derivatives thereof.

3. The polymeric mold of claim 1, the polycyclic monomer comprising dicyclopentadiene, and wherein from about 0.5 to about 50 mol of dicyclopentadiene crosslinks the polymer.

4. The polymeric mold of claim 1, the polymer comprising:
   from about 20 to about 80 wt. % of the polycyclic monomer, and
   from about 20 to about 80 wt. % of the cyclic monomer, relative to the total weight of the polymer.

5. The polymeric mold of claim 1, the mole ratio of polycyclic monomer to cyclic monomer comprising from about 1:3 to about 1:7.

6. The polymeric mold of claim 1, the fluorinated cyclic monomer comprising from about 0.1 to about 25 wt. % of the polymer relative to the total weight of the polymer.

7. The polymeric mold of claim 1, the polymer comprising:
   from about 20 to about 80 wt. % of the polycyclic monomer,
   from about 0.1 to about 25 wt. % of the fluorinated cyclic monomer, and
   from about 20 to about 80 wt. % of the cyclic monomer, all relative to the total weight of the polymer.

8. The polymeric mold of claim 1, the mold comprising a plurality of microstructured features, each feature having a dimension of less than about 2 mm.

9. The polymeric mold of claim 1, the mold comprising a plurality of microstructured features, each feature having a dimension of less than about 500 um.

* * * * *

UNITED STATES PATENT AND TRADEMARK OFFICE
CERTIFICATE OF CORRECTION

PATENT NO. : 8,333,360 B2
APPLICATION NO. : 12/999022
DATED : December 18, 2012
INVENTOR(S) : Joseph Douglas Rule et al.

It is certified that error appears in the above-identified patent and that said Letters Patent is hereby corrected as shown below:

Title Page, item 56 Column 2,
Under "Other Publications", line 1, delete ""Nancifeature" and insert -- "Nanofeature --, therefor.

Under "Other Publications", line 13, delete "Ccuntilun." and insert -- Commun. --, therefor.

In the Specification:
Column 4,
Line 66, delete "$R_1$" and insert -- $R^1$ --, therefor.

Column 5,
Line 38, delete "–CO2" and insert -- $–CO_2$ --, therefor.
Line 40, delete "to 50" and insert -- to 50. --, therefor.
Line 55, delete "–CO2" and insert -- $–CO_2$ --, therefor.

Column 6,
Line 8, delete "polycylic" and insert -- polycyclic --, therefor.
Line 10, delete "chosing" and insert -- choosing --, therefor.
Line 25, delete "macrophase" and insert -- macrophage --, therefor.

Column 9,
Line 53, delete ") Optical" and insert -- ). Optical --, therefor.
Line 63, delete "et al)." and insert -- et al.). --, therefor.

Column 10,
Line 33, delete "backing" and insert -- backing. --, therefor.

Column 11,
Line 28, delete "nitrogen" and insert -- nitrogen. --, therefor.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,333,360 B2

<u>Column 13,</u>
Line 10, delete "Dicylopentadiene" and insert -- Dicyclopentadiene --, therefor.
Lines 35-36, delete "Dicylopentadiene" and insert -- Dicyclopentadiene --, therefor.
Line 63, delete "Dicylopentadiene" and insert -- Dicyclopentadiene --, therefor.

<u>In the Claims:</u>
<u>Column 18,</u>
Line 13, in Claim 3, delete "50 mol" and insert -- 50 mol % --, therefor.
Line 17, in Claim 4, after "monomer," insert -- both --.
Lines 19-20, in Claim 5, delete "polycylic" and insert -- polycyclic --, therefor.